(12) United States Patent
Wang et al.

(10) Patent No.: US 11,513,248 B2
(45) Date of Patent: Nov. 29, 2022

(54) IMAGING WITH BOTH DIPOLE AND QUADRUPOLE RECEIVERS

(71) Applicant: Halliburton Energy Services, Inc., Houston, TX (US)

(72) Inventors: Ruijia Wang, Singapore (SG); Brian Edward Hornby, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 350 days.

(21) Appl. No.: 16/682,949

(22) Filed: Nov. 13, 2019

(65) Prior Publication Data

US 2021/0141115 A1 May 13, 2021

(51) Int. Cl.
*G01V 1/48* (2006.01)
*G01V 1/46* (2006.01)
*G01V 1/50* (2006.01)

(52) U.S. Cl.
CPC .............. *G01V 1/48* (2013.01); *G01V 1/46* (2013.01); *G01V 1/50* (2013.01); *G01V 2210/54* (2013.01)

(58) Field of Classification Search
USPC ........................................................... 702/9
See application file for complete search history.

(56) References Cited

U.S. PATENT DOCUMENTS

| 4,817,059 A | 3/1989 | Hornby et al. |
| 7,035,165 B2 | 4/2006 | Tang |
| 2005/0034917 A1 | 2/2005 | Mathiszik et al. |
| 2005/0067191 A1* | 3/2005 | Miyamoto ............... G01V 1/52 175/50 |
| 2007/0097788 A1 | 5/2007 | Tang et al. |
| 2008/0151690 A1 | 6/2008 | Tang et al. |
| 2009/0205899 A1 | 8/2009 | Geerits et al. |

(Continued)

FOREIGN PATENT DOCUMENTS

| WO | 2019-084126 | 5/2019 |
| WO | 2020222744 A1 | 11/2020 |

OTHER PUBLICATIONS

Schlumberger, Sonic Scanner, Acoustic Scanning Platform, Nov. 2005.

(Continued)

*Primary Examiner* — Paul D Lee
(74) *Attorney, Agent, or Firm* — John Wustenberg; C. Tumey Law Group PLLC

(57) ABSTRACT

A method and system for locating a reflector in a formation. The method may comprise broadcasting a sonic waveform as a shear formation body wave or a compressional formation body wave into the formation, recording a reflected wave from a reflector with the one or more receivers as dipole data by the dipole receiver and quadrupole data by the quadrupole receiver, and processing the dipole data and the quadrupole data with an information handling system to determine a location of the reflector from the borehole sonic logging tool. The system may comprise a borehole sonic logging tool and an information handling system. The borehole sonic logging tool may comprise one or more transmitters configured to transmit a sonic waveform into a formation and one or more receivers configured to record a reflected wave as a dipole receiver for dipole data and a quadrupole receiver for quadrupole data.

20 Claims, 10 Drawing Sheets

(56) References Cited

U.S. PATENT DOCUMENTS

| | | |
|---|---|---|
| 2012/0069713 A1 | 3/2012 | Geerits et al. |
| 2013/0064039 A1* | 3/2013 | Pabon ..................... G01V 1/46 367/25 |
| 2013/0179082 A1 | 7/2013 | Geerits |
| 2018/0045844 A1 | 2/2018 | Oshima et al. |

OTHER PUBLICATIONS

Baker Hughes, Xmac F1 Service, High-quality acoustic data in the most challenging environments, 2011.
Halliburton, Xaminer Sonic Imager Service, H011818, Nov. 2018.
International Search Report and Written Opinion for Application No. PCT/US2019/063701, dated Aug. 11, 2020.

* cited by examiner

US 11,513,248 B2

IMAGING WITH BOTH DIPOLE AND QUADRUPOLE RECEIVERS

BACKGROUND

In order to obtain hydrocarbons such as oil and gas, boreholes are drilled through hydrocarbon-bearing subsurface formations. Logging tests are subsequently made to determine the properties of formations surrounding the borehole. In wireline logging, a drilling apparatus that forms the borehole is removed so that testing equipment can be lowered into the borehole for testing. In measurement-while-drilling techniques, the testing equipment is conveyed down the borehole along with the drilling equipment. These tests may include resistivity testing equipment, gamma radiation testing equipment, seismic imaging equipment, etc. In examples, seismic imaging using borehole acoustic measurements may obtain an image of the formation structural changes, which may be referred to as a reflector.

Traditionally, a transmitter emits acoustic signals into the fluid-filled borehole. In examples, some of the signals may traverse through the formation and are reflected back to the borehole by a reflector in the formation. The reflected signals may travel back to the borehole and be captured by the receivers in the borehole. In examples, SH waves (a shear wave) may be polarized so that its particle motion and direction of propagation are contained in a horizontal plane, which may make the shear waves sensitive to reflectors. Using reflected shear waves may allow for imaging the fracture system outside of the well. Currently, transmitting and capturing the reflected shear waves that then reflect off near-borehole boundaries may be accomplished using dipole sources quadrupole sources, and receivers. However, both a dipole measurement system and a quadrupole measurement system are not able to accurately locate the direction of the reflector from the transmitter and receiver.

BRIEF DESCRIPTION OF THE DRAWINGS

These drawings illustrate certain aspects of some examples of the present disclosure and should not be used to limit or define the disclosure.

DETAILED DESCRIPTION

This disclosure may generally relate to systems and methods for measuring reflected waves from a reflector by dipole receivers and quadrupole receivers to determine a location of the reflector within a formation. As discussed below, systems and method determine the azimuth of reflected shear waves by using measurements from both a dipole receiving system and a quadrupole receiving system. Combing the dipole data and the quadrupole data, personnel may identify the azimuth of the reflector by maximizing reflected shear wave signals. In examples, the two receiving systems may not be required as two sets of the hardware system as two sets of signals may be processed by software from an information handling system to simulate both dipole measurements and quadrupole measurements in any direction.

Figure 1:
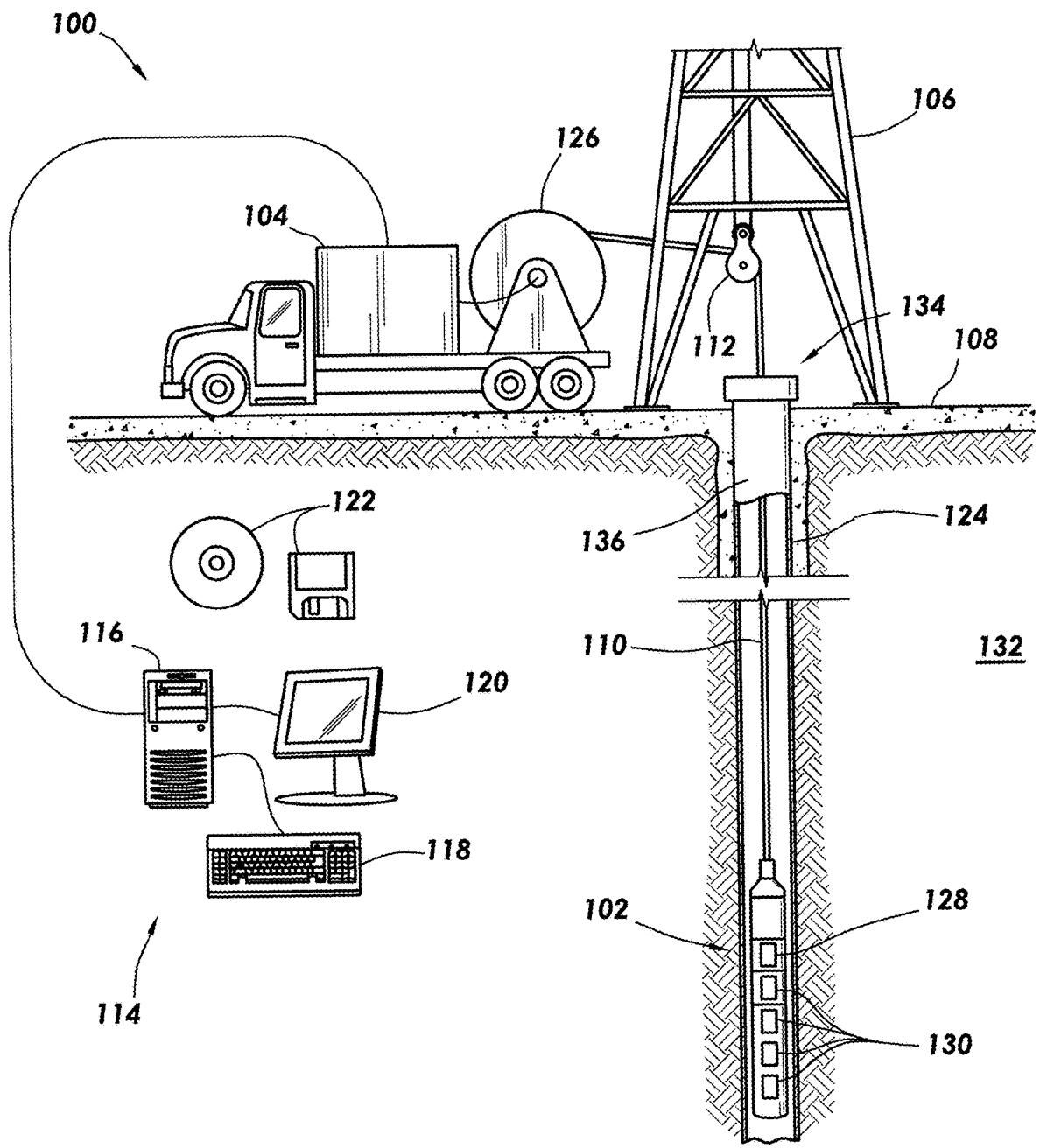
FIG. 1 illustrate an example of a borehole sonic logging system.

FIG. 1 illustrates a cross-sectional view of a borehole sonic logging system 100. As illustrated, borehole sonic logging system 100 may comprise a borehole sonic logging tool 102 attached to a vehicle 104. In examples, it should be noted that borehole sonic logging tool 102 may not be attached to a vehicle 104. Borehole sonic logging tool 102 may be supported by rig 106 at surface 108. Borehole sonic logging tool 102 may be tethered to vehicle 104 through conveyance 110. Conveyance 110 may be disposed around one or more sheave wheels 112 to vehicle 104. Conveyance 110 may include any suitable means for providing mechanical conveyance for borehole sonic logging tool 102, including, but not limited to, wireline, slickline, coiled tubing, pipe, drill pipe, downhole tractor, or the like. In some embodiments, conveyance 110 may provide mechanical suspension, as well as electrical connectivity, for borehole sonic logging tool 102. Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 104 and borehole sonic logging tool 102. Information from borehole sonic logging tool 102 may be gathered and/or processed by information handling system 114. For example, signals recorded by borehole sonic logging tool 102 may be stored on memory and then processed by borehole sonic logging tool 102. The processing may be performed real-time during data acquisition or after recovery of borehole sonic logging tool 102. Processing may alternatively occur downhole or may occur both downhole and at surface. In some embodiments, signals recorded by borehole sonic logging tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to borehole sonic logging tool 102.

Systems and methods of the present disclosure may be implemented, at least in part, with information handling system 114. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as various input and output (I/O) devices, such as an input device 118 (e.g., keyboard, mouse, etc.) and a video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

As illustrated, borehole sonic logging tool 102 may be disposed in borehole 124 by way of conveyance 110. Borehole 124 may extend from a wellhead 134 into a formation 132 from surface 108. Generally, borehole 124 may include horizontal, vertical, slanted, curved, and other types of borehole geometries and orientations. Borehole 124 may be cased or uncased. In examples, borehole 124 may comprise a metallic material, such as tubular 136. By way of example, the tubular 136 may be a casing, liner, tubing, or other elongated steel tubular disposed in borehole 124. As illustrated, borehole 124 may extend through formation 132. Borehole 124 may extend generally vertically into the formation 132. However, borehole 124 may extend at an angle through formation 132, such as horizontal and slanted boreholes. For example, although borehole 124 is illustrated as a vertical or low inclination angle well, high inclination angle or horizontal placement of the well and equipment may be possible. It should further be noted that while borehole 124 is generally depicted as a land-based operation, those skilled in the art may recognize that the principles described herein are equally applicable to subsea operations that employ floating or sea-based platforms and rigs, without departing from the scope of the disclosure.

In examples, rig 106 includes a load cell (not shown) which may determine the amount of pull on conveyance 110 at surface 108 of borehole 124. While not shown, a safety valve may control the hydraulic pressure that drives drum 126 on vehicle 104 which may reel up and/or release conveyance 110 which may move borehole sonic logging tool 102 up and/or down borehole 124. The safety valve may be adjusted to a pressure such that drum 126 may only impart a small amount of tension to conveyance 110 over and above the tension necessary to retrieve conveyance 110 and/or borehole sonic logging tool 102 from borehole 124. The safety valve is typically set a few hundred pounds above the amount of desired safe pull on conveyance 110 such that once that limit is exceeded; further pull on conveyance 110 may be prevented.

In examples, borehole sonic logging tool 102 may operate with additional equipment (not illustrated) on surface 108 and/or disposed in a separate borehole sonic logging system (not illustrated) to record measurements and/or values from formation 132. Borehole sonic logging tool 102 may comprise a transmitter 128. Transmitter 128 may be connected to information handling system 114, which may further control the operation of transmitter 128. Transmitter 128 may include any suitable transmitter for generating sound waves that travel into formation 132, including, but not limited to, piezoelectric transmitters. Transmitter 128 may be a monopole source, a multi-pole source (e.g., a dipole source, quadrupole source), high-order multipole, or any combination of multiple sources. Combinations of different types of transmitters may also be used. During operations, transmitter 128 may broadcast sound waves (e.g., sonic waveforms) from borehole sonic logging tool 102 that travel into formation 132. The sound waves may be emitted at any suitable frequency range. For example, a broad band response could be from about 0.2 KHz to about 20 KHz, and a narrow band response could be from about 1 KHz to about 6 KHz. It should be understood that the present technique should not be limited to these frequency ranges. Rather, the sounds waves may be emitted at any suitable frequency for a particular application.

Borehole sonic logging tool 102 may also include a receiver 130. As illustrated, there may be a plurality of receivers 130 disposed on borehole sonic logging tool 102. Receiver 130 may include any suitable receiver for receiving sound waves, including, but not limited to, piezoelectric receivers. For example, the receiver 130 may be a monopole receiver or multi-pole receiver (e.g., a dipole receiver). In examples, a monopole receiver 130 may be used to record compressional-wave (P-wave) signals, while the multi-pole receiver 130 may be used to record shear-wave (S-wave) signals. Receiver 130 may have the function of recording dipole signals from two directions that are perpendicular to each other. Receiver 130 may also have the function of recording quadrupole signals from two directions that have 45 degree apart. In examples, signals recorded by receiver 130 may be digitally created by information handling system 114 in any direction to simulate dipole and quadrupoles measurements. Receiver 130 may measure and/or record sound waves broadcast from transmitter 128 as received signals. The sound waves received at receiver 130 may include both direct waves that traveled along the borehole 124 and refract through formation 132 as well as waves that traveled through formation 132 and reflect off of near-borehole bedding and propagate back to the borehole. The reflected waves may include, but are not limited to, compressional (P) waves and shear (S) waves. By way of example, the received signal may be recorded as an acoustic amplitude as a function of time. Information handling system 114 may control the operation of receiver 130. The measured sound waves may be transferred to information handling system 114 for further processing. In examples, there may be any suitable number of transmitters 128 and/or receivers 130, which may be controlled by information handling system 114. Information and/or measurements may be processed further by information handling system 114 to determine properties of borehole 124, fluids, and/or formation 132. By way of example, the sound waves may be processed to generate a reflection image of formation structures, which may be used for dip analysis as discussed in more detail below.

Figure 2:
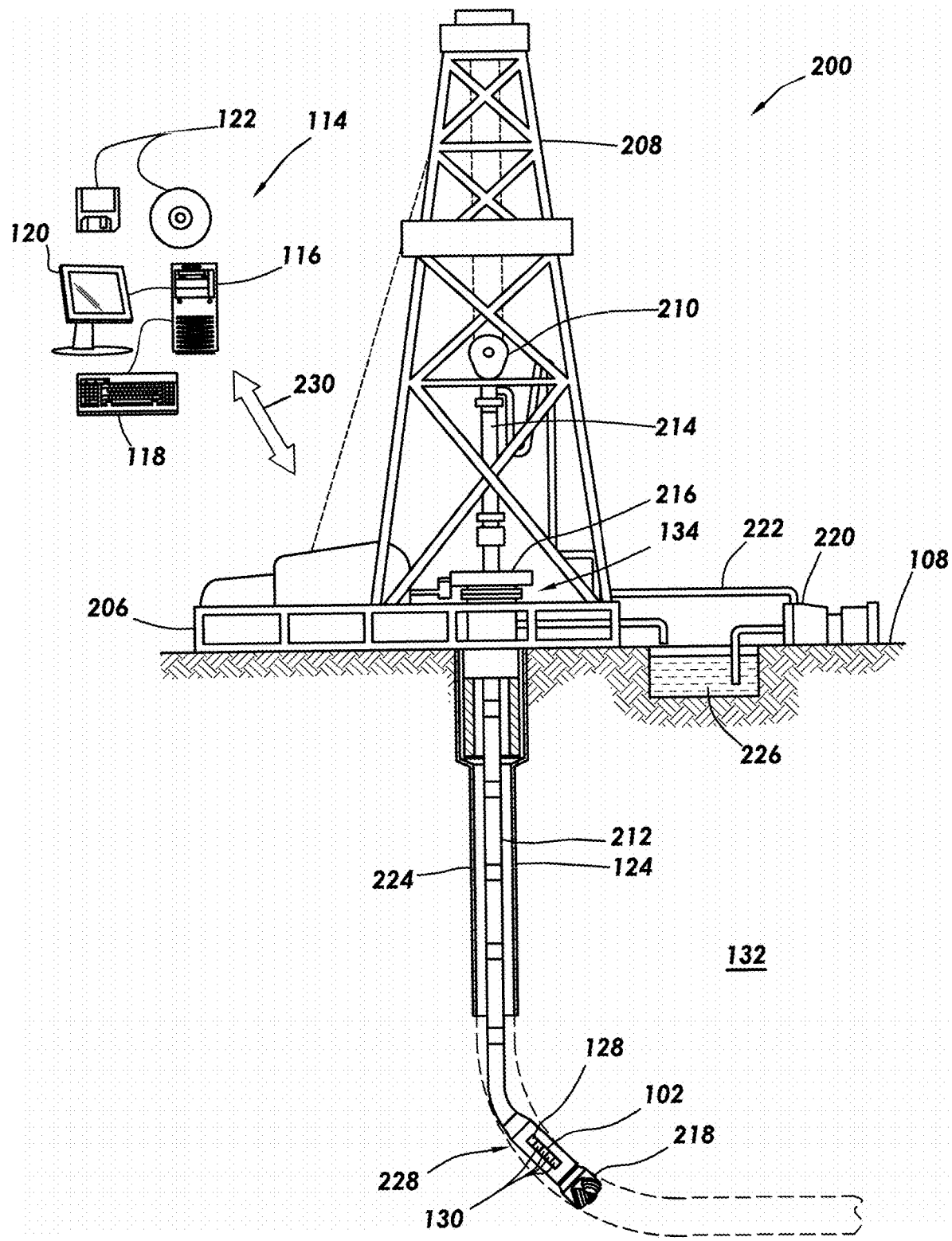
FIG. 2 illustrates an example of a drilling system.

FIG. 2 illustrates an example in which borehole sonic logging tool 102 may be included in a drilling system 200. As illustrated, borehole 124 may extend from wellhead 134 into formation 132 from surface 108. A drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend borehole 124 that penetrates various subterranean formations 204. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 134 and may traverse borehole 124. Drill bit 218 may be attached to a distal end of drill string 212 and may be driven, for example, either by a downhole motor and/or via rotation of drill string 212 from surface 108. Drill bit 218 may be a part of bottom hole assembly 228 at distal end of drill string 212. Bottom hole assembly 228 may further comprise borehole sonic logging tool 102. Borehole sonic logging tool 102 may be disposed on the outside and/or within bottom hole assembly 228. Borehole sonic logging tool 102 may comprise a plurality of transmitters 128 and/or receivers 130. Borehole sonic logging tool 102 and/or the plurality of transmitters 128 and receivers 130 may operate and/or function as described above. As will be appreciated by those of ordinary skill in the art, bottom hole assembly 228 may be a measurement-while drilling (MWD) and/or logging-while-drilling (LWD) system.

Without limitation, bottom hole assembly 228, transmitter 128, and/or receiver 130 may be connected to and/or controlled by information handling system 114, which may be disposed on surface 108. Without limitation, information handling system 114 may be disposed down hole in bottom hole assembly 228. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 228 may be brought to surface 108. In examples, information handling system 114 may communicate with bottom hole assembly 228 through a communication line (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive, as well as process, information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided which may transmit data from bottom hole assembly 228 to an information handling system 114 at surface 108. Information handling system 114 may include a processing unit 116, a video display 120, an input device 118 (e.g., keyboard, mouse, etc.), and/or non-transitory computer-readable media 122 (e.g., optical disks, magnetic disks) that may store code representative of the methods described herein. In addition to, or in place of processing at surface 108, processing may occur downhole.

Figure 3:
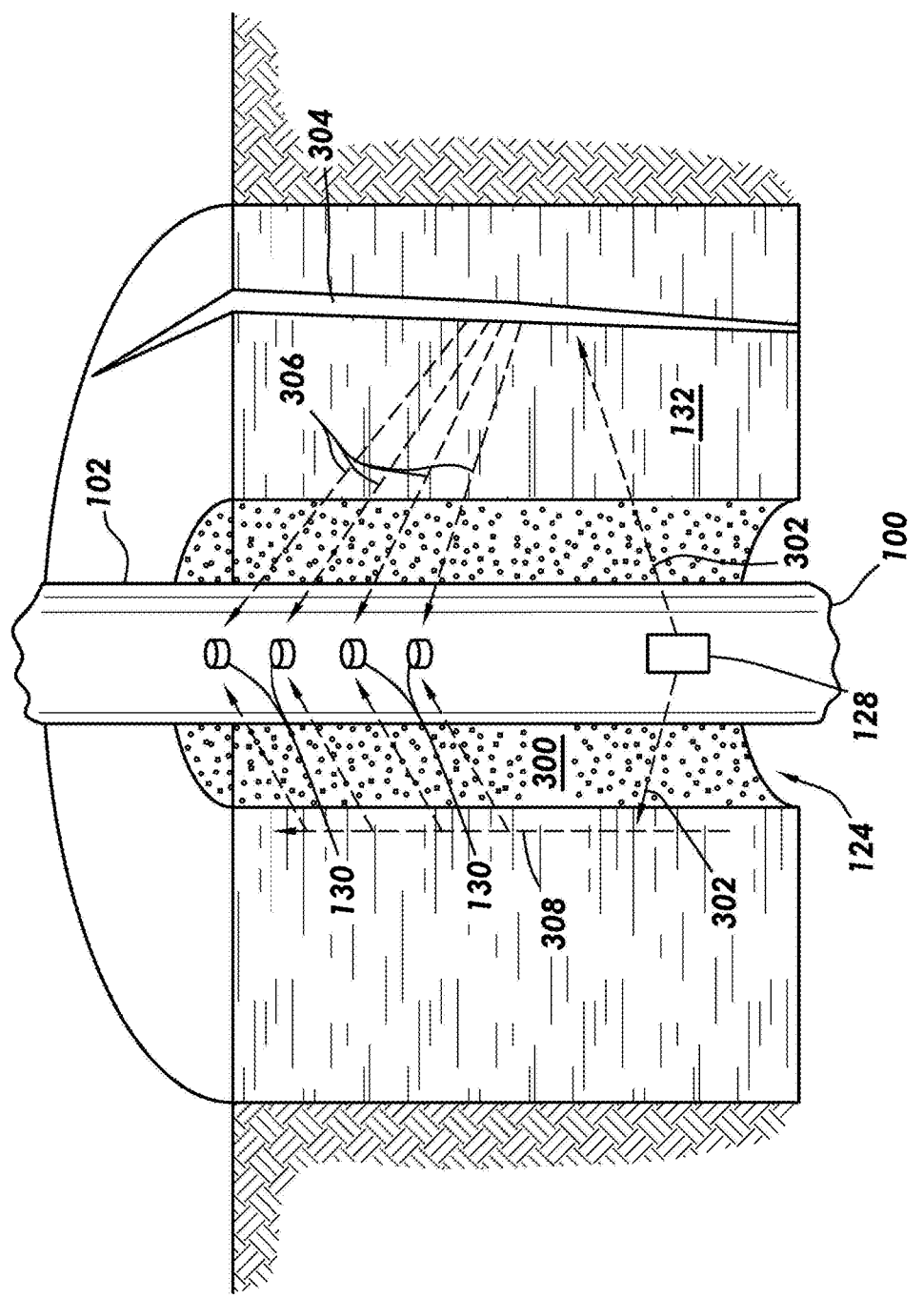
FIG. 3 illustrate an example of a borehole sonic logging tool disposed in a borehole.

FIG. 3 illustrates an example of reflected wave imaging with borehole sonic logging tool 102. As illustrated, borehole sonic logging tool 102 may be disposed in a borehole 124, which may be filled with fluid 300. In examples, transmitter 128 may emit sonic waveforms 302 into borehole 124. In examples, at least one sonic waveform 302 may travel into formation 132 and may be reflected as a reflected signal 306 by a reflector 304 in formation 132. It should be noted that reflected signal 306 may also be referred to as a reflected wave. Without limitation, reflector 304 may be a formation boundary, a fault, a cave, or a fracture. In examples, reflected signals 306 may travel back to borehole 124 and may be captured by receivers 130 in borehole 124. Simultaneously, sonic waveforms 302 signals which may become trapped in borehole 124 as borehole guide waves 308 may propagate along the axis of borehole 124 and may be captured by receivers 130. In examples, borehole guide waves 308 may "wash out" reflected signals 306, which may reflect from reflector 304 away from borehole 124. For example, borehole guide waves 308 may prevent reflected signals 306 from being recorded or may be recorded over reflected signals 306.

Reflected signals 306 may be captured utilizing the same type of transmitter 128 and receiver 130. For example, both transmitter 128 and receiver 130 may be a monopole or a dipole. As illustrated in FIG. 3, both borehole guide waves 308 and reflected signals 306 may be recorded by receiver 130. Generally, a filtering procedure may remove borehole guided waves 308, which may be considered noise when imaging with reflected signals 306.

However, for detecting reflected signals 306 that travel at least one wavelength from a reflector 304, receiver 130 and transmitter 128 may not need to be the same type of device. For example, in single-well imaging techniques a transmitter 128 may emit sonic waveform 302 as a formation body wave. A formation body wave may be transmitted and received by type of transmitter 128 and/or receiver 130. Additionally, formation body waves that may be transmitted or received by different types of transmitters 128 or receivers 130 may also be formation body waves.

During measurement operations, utilizing mixed types of transmitters 128 and receivers 130 may suppress borehole guide waves 308. For example, if transmitter 128 and receiver 130 are of different types, no signal will be recorded. However, because of tool eccentricity or other factors, coupled wave field with other azimuthal types might be generated, and receiver 130 may capture at least a portion of coupled wave fields.

During measurement operations which may use horizontal-polarized shear waves, all types of transmitters 128, except a monopole transmitter, may generate any formation body wave into formation 132, with continued reference to FIG. 3. For example, a dipole transmitter may generate horizontally polarized shear formation body waves with a radiation pattern of a numerical "8." Likewise, a quadrupole source may generate horizontally polarized shear formation body waves in formation 132 with a radiation pattern of 'quatrefoil.' During measurement operations, there may be different methods for operating a dipole transmitter or a quadrupole transmitter.

Figure 4A:
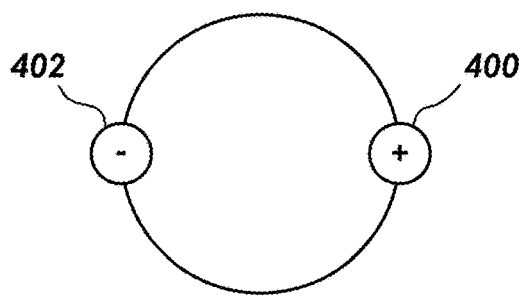
FIG. 4A illustrates a dipole transmitter and/or receiver.
Figure 4B:
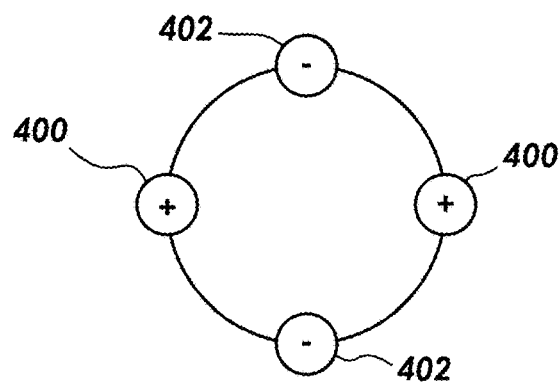
FIG. 4B illustrates a quadrupole transmitter and/or receiver.

For the discussion below, both a dipole measurement system and quadrupole measurement system may be used separately and/or together on borehole sonic logging tool 102. FIGS. 4A and 4B shows the sketch map for a dipole (FIG. 4A) and a quadrupole (FIG. 4B), represented by a combination of a number of point receivers. For example, a dipole may be represented by two-point sources with opposite phase, a positive phase point receiver 400 and a negative phase point receiver 402. During measurement operations, the dipole may emit horizontally polarized shear formation body waves in any direction except the two azimuths where positive phase point receiver 400 and negative phase point receiver 402 are disposed. A quadrupole, as illustrated in FIG. 4B, may be represented by four-point sources with different phases, two positive phase point receivers 400 and two negative phase point receivers 402. During measurement operations, the quadrupole may generate horizontally polarized shear formation body waves to any azimuth except the azimuths each positive phase point receiver 400 and negative phase point receiver 402 are disposed. It should be noted that a dipole receiver and a quadrupole receiver may be represented by a number of point receivers and may only sense reflected signals 306 and/or borehole guide waves 308 (e.g., referring to FIG. 3) in any azimuth except the azimuth where the point receivers may be facing. The fields for transmission and receiver may be illustrated as a pattern in a three-hundred-and-sixty-degree path.

Figure 5:
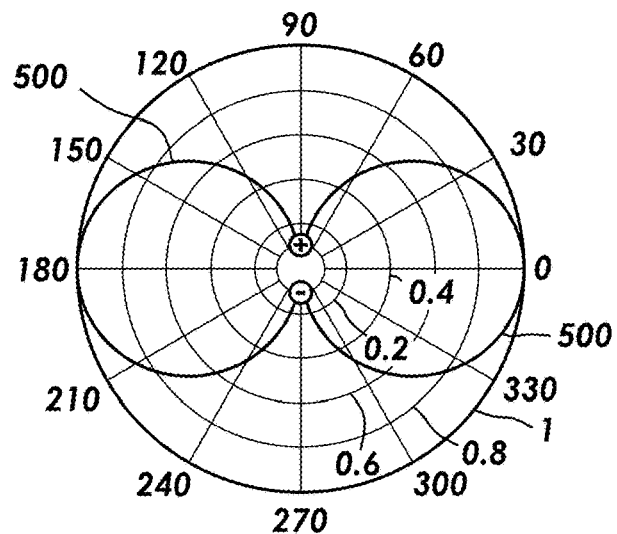
FIG. 5 is a graph of a dipole radiation and/or reception pattern.
Figure 6:
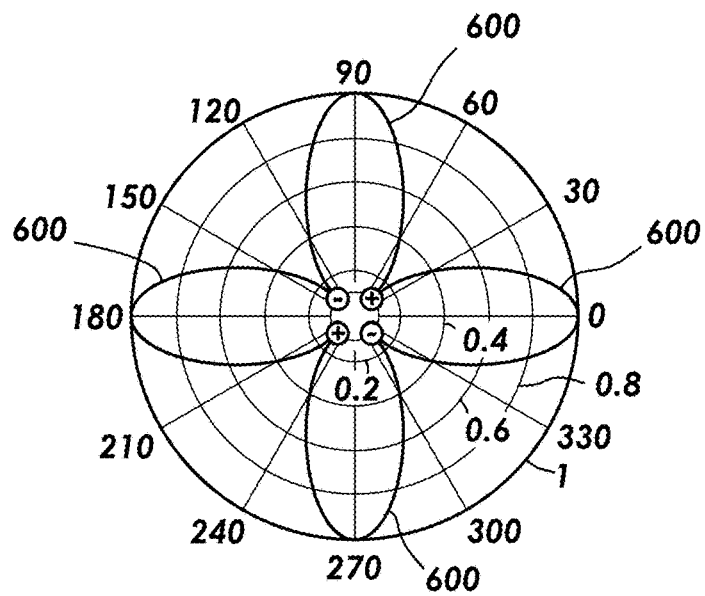
FIG. 6 is a graph of a quadrupole radiation and/or reception pattern.

For example, FIG. 5 illustrate a theoretical radiation/receiving pattern of horizontally polarized shear formation body waves for a dipole source and a receiver. FIG. 6 illustrates a theoretical radiation/receiving pattern for a quadrupole source/receiver, in a fluid-filled borehole 124 (e.g., referring to FIG. 1). FIG. 5 shows that the dipole radiation/receiving pattern shows a shape of the number 8, with target azimuth at 0-degree and 180-degree. FIG. 6 shows that the quadrupole radiation/receiving pattern shows a shape of 'quatrefoil' with target azimuth at 0-, 90-, 180-, and 270-degree. Comparing FIG. 5 with FIG. 6, dipole lobe 500 may be wider than quadrupole lobe 600. The wider lobe for dipole lobe 500 may reduce resolution in determining an azimuth of horizontally polarized shear formation body waves. Additionally, there are two dipole lobes 500 in FIG. 5, which may allow for two areas to estimate the azimuth of horizontally polarized shear formation body waves, as each dipole lobe 500 may have a 180-degree uncertainty in the radiation and receiving patterns. As illustrated in FIG. 6, the quadrupole pattern and four quadrupole lobes 600 may be narrower than the dipole pattern and dipole lobes 500 in FIG. 5. Therefore, quadrupole lobes 600 may have a higher azimuthal resolution. Quadrupole lobes 600 may provide four solutions for horizontally polarized shear azimuth estimates as each quadrupole lobe 600 may have a 90-degree uncertainty in the radiation and receiving patterns.

During measurement operation, a dipole receiving system (e.g., referring to FIG. 5) has a different receiving pattern than a quadrupole receiving system and the receiving pattern (e.g., referring to FIG. 6) associated with the quadrupole receiving system. As discussed above in FIG. 5, a dipole receiving pattern includes two dipole lobes 500 with opposite phase. Used alone, personnel cannot determine the azimuth of reflector 304 in formation 132 (e.g., referring to FIG. 1) with a dipole receiving system. Additionally, as discussed above in FIG. 6, a quadrupole receiving pattern, which includes four quadrupole lobes 600 with different phases, suggesting four possible answers for the final estimates of an azimuth of a reflector 304 in formation 132. Used alone, personnel cannot determine the azimuth of reflector 304 in formation 132 with a quadrupole receiving system, because they do not know which quadrupole lobe 600 is corresponding to the true reflector. As noted above, for a dipole receiving system, the 0-degree signal and the 180-degree signal have opposite phase, while for a quadrupole receiving system, the 0-degree signal and the 180-degree signal have the same phase. By combining measurements from both dipole receiving system and quadrupole receiving system, an accurate image as to where a reflector 304 may be located within formation 132 may be found.

Figure 7:
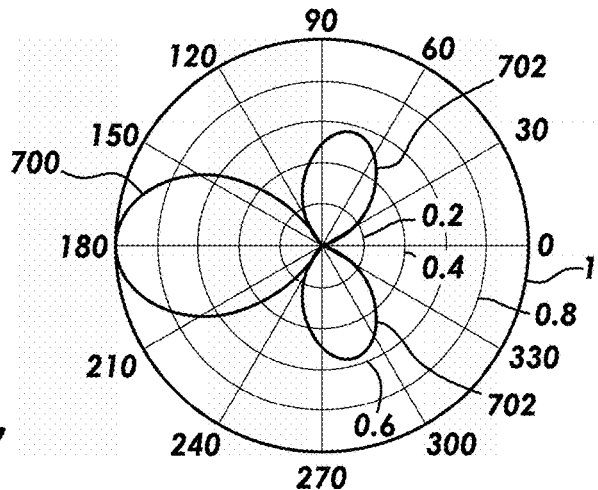
FIG. 7 is an example of a graph of a combined dipole and quadrupole receiving system.

As illustrated in FIG. 7, when combining measurements from a dipole receiving system and a quadrupole receiving system, after a normalization calculation, one lobe may be cancelled, which may leave a main lobe 700 and two side lobes 702. Combining measurements from a dipole receiving system and a quadrupole receiving system may be expressed as:

$$Wav(d,t,\theta) = W_1 Wav_{DP}(d,t,\theta) + W_2 Wav_{QP}(d,t,\theta) \qquad (1)$$

Where $Wav(d, t, \theta)$ denotes the resulting waveforms, $Wav_{DP}(d, t, \theta)$ and $Wav_{QP}(d, t, \theta)$ represent the dipole and quadrupole waveforms, $W_1$ and $W_2$ are complicated numbers utilized for compensating the amplitude and phase change due to borehole modulation. Additionally, the variable 'd', 't' and 'θ' are depth, time and azimuth of the data, respectively. In examples, the processing may be performed in the frequency domain, expressed as:

$$Wav'(d,f,\theta)=W_1(f)Wav'_{SP}(d,f,\theta)+W_2(f)Wav_{QP}(d,f,\theta) \qquad (2)$$

Where Wav'(d, f, θ) denotes the resulting waveforms in the frequency domain, Wav'$_{DP}$(d, f, θ) and Wav$_{QP}$(d, f, θ) represent the dipole and quadrupole waveforms in the frequency domain. The receiving pattern of Wav(d, t, θ) or Wav'(d, f, θ) is shown in FIG. 7, where the borehole effects are fully compensated. As illustrated in FIG. 7, side lobes 702 may have a level of 0.55 at the azimuth of 80- and 280-degree and main lobe 700 may be clear with a level of 1. Moreover, the amplitude at the azimuth having a 180-deg phase difference to main lobe 700 is minimized to 0, suggesting that the 180-degree uncertainty in traditional dipole-dipole SH imaging system is solved.

Figure 8:
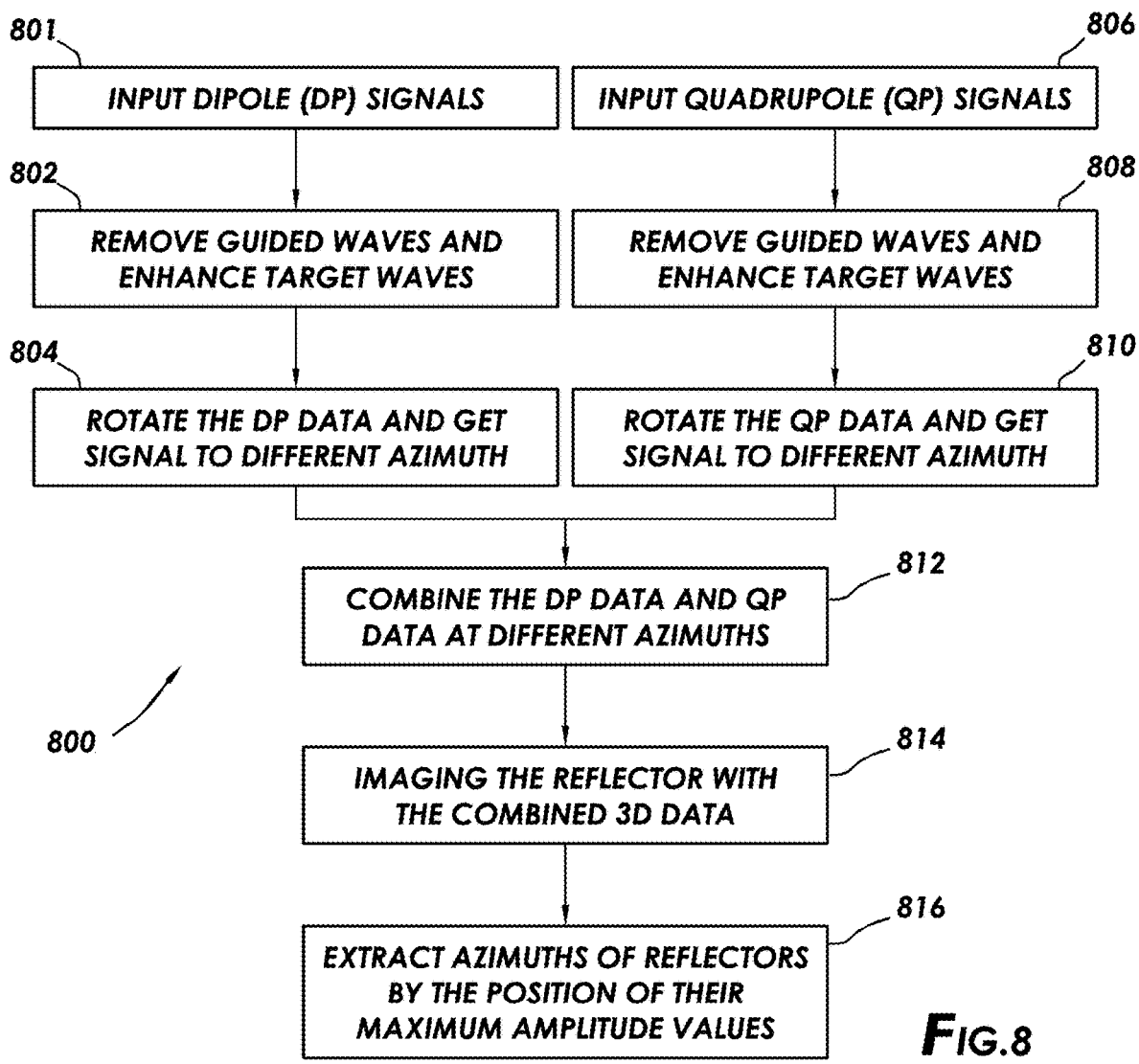
FIG. 8 is a workflow for combining dipole measurements and quadrupole measurements.
Figure 9:
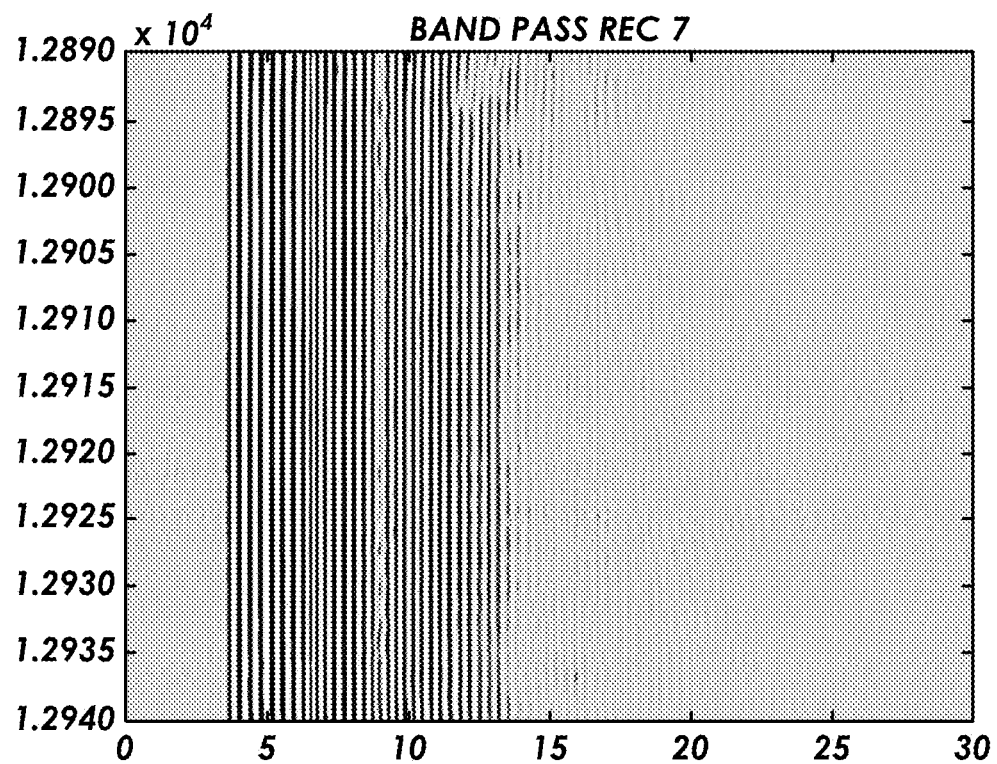
FIG. 9 is an example of an image formed from recording dipole measurements.

FIG. 8 illustrates workflow 800 for combining measurements from both a dipole receiving system and a quadrupole receiving system. As illustrated, in block 801 measurements taken by a dipole receiving system are input into information handling system 114 (e.g., referring to FIG. 1). The dipole measurements may include data for at least two directions, allowing a digital rotation of the data by information handling system 114 (e.g., referring to FIG. 1) to arbitrary directions. Often the two measured directions may be about 90 degree apart. FIG. 9 illustrates an image of the raw waveforms captured by a receiver 130 (e.g., referring to FIG. 1), which is a dipole, in the form of common-offset-gather.

The input measurements from block 801 may be processed by information handling system 114 to remove guided waves and enhance reflected waves in block 802. It should be noted that reflected waves may also be referred to as target waves. For example, the guided waves may often have similar arrival times at a common-offset-gather of the sonic data, while the reflected waves often have different arrival times in the measured data. A median filter may be applied to the depth dimension in order to extract the waves having the same arrival time at different depths. The median filter is a nonlinear filter in which each output sample is computed as the median value of the input samples within a depth window. The depth window is defined by personnel and determines the measurements at a specific depth or range of depth within borehole 124 (e.g., referring to FIG. 1) that may be used in workflow 800. In examples, the length of the depth window is a parameter that may be adjusted by a user using a series of processing trials to identify a window length that helps in the identification of guided waves.

Figure 11:
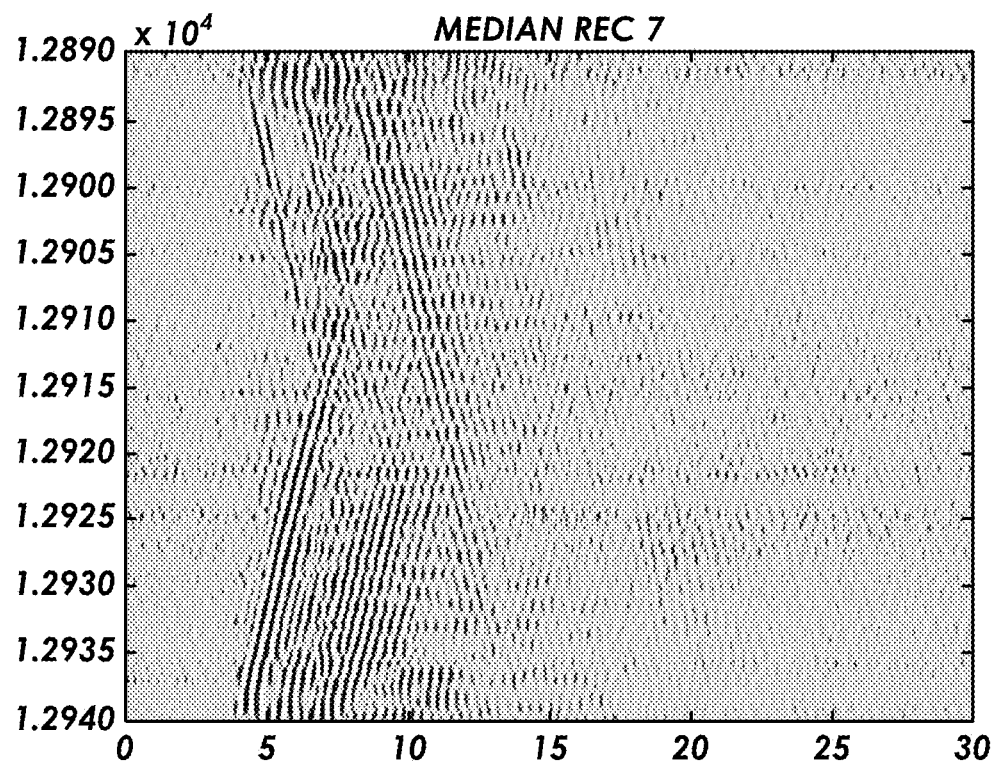
FIG. 11 is an example of an image formed from the recording dipole measurements after removing guided waves from processing.

The extraction of guided waves at a depth may be performed by defining a depth window for processing, then selecting a time index for processing, after which a median value of the input data at the selected time index and within the depth window is found. Processing may then be performed on all the time index, which may allow for a waveform with guided waves having the same arrival time at different depths is extracted. The extracted guided waves may then be removed from the raw waveforms that were measured by receiver 130 (e.g., referring to FIG. 3) by simple subtraction. For example, FIG. 11 is an image of a dipole signal after a guide-wave reduction method using the median filter. To enhance the reflected waves, a user may stack the target signals from different depths together after compensating for different travel times in order to enhance the signal to noise ratio (SNR) of the target signals. Stacking is defined as summing all waveform data, which may be performed in several steps. To perform stacking, personnel may estimate the travel time differences of the reflected signals at different depths, shift the reflected signals in time domain by compensating the travel time difference to the reference depth, take the sum all the waves shifted to the reference depth as the final outputs. The processed dipole data from block 802 are then rotated to different azimuths to determine dipole data for each azimuth in block 804.

Figure 10:
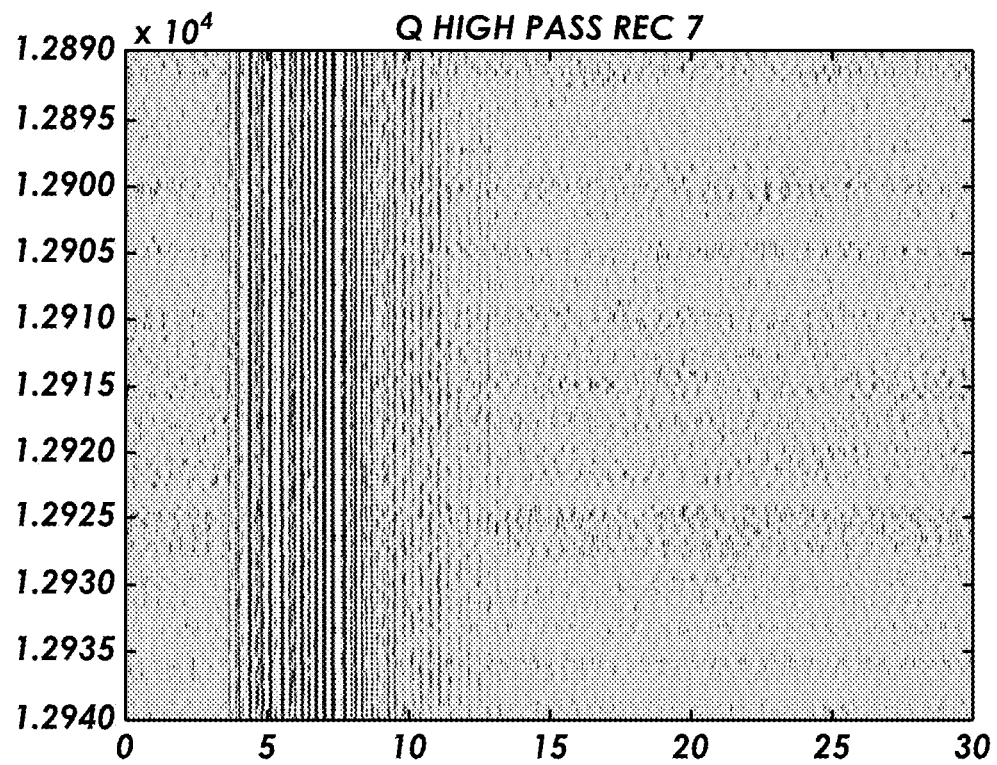
FIG. 10 is an example of an image formed from recording quadrupole measurements.

In examples, block 806 measurements taken by a quadrupole receiving system are input into information handling system 114 (e.g., referring to FIG. 1). The quadrupole measurements may include data from at least two directions, allowing a digital rotation of the data to arbitrary directions. Often the two measured directions may be about 45 degree apart. FIG. 10 is an image showing raw waveforms captured by a receiver 130 (e.g., referring to FIG. 1) which is a quadrupole.

Figure 12:
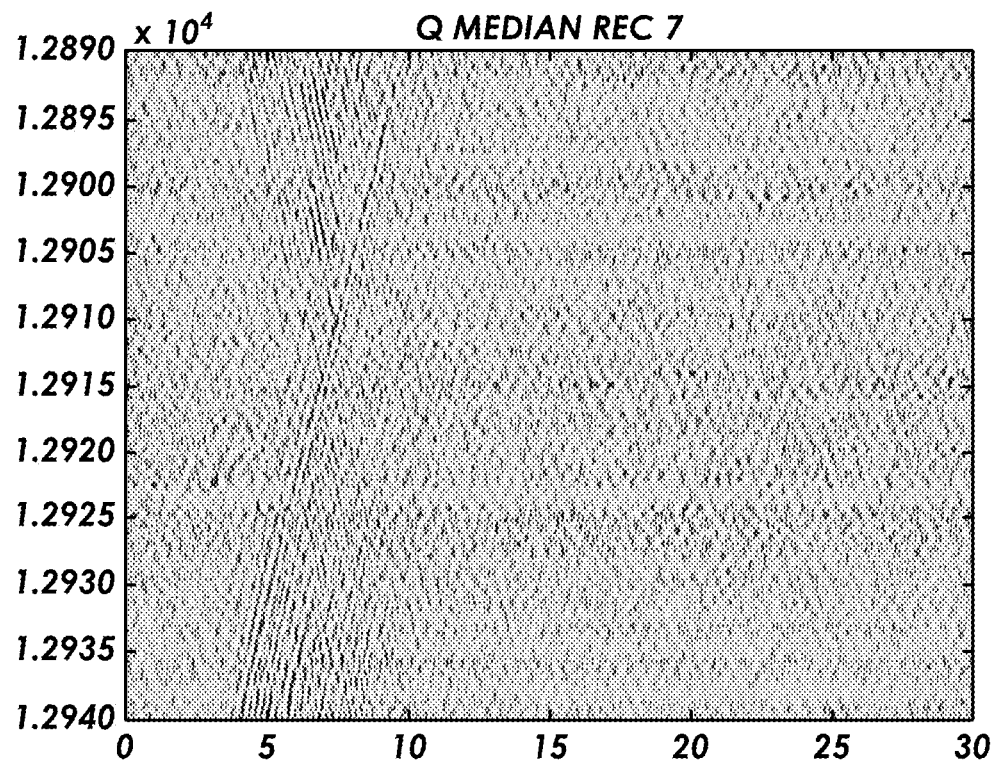
FIG. 12 is an example of an image formed from the recording quadrupole measurements after removing guided waves from processing.

In block 808, the input measurements from block 806 are processed to remove guided waves and enhance target waves similar to the methods in blocks 802. For example, the guided waves may often have similar arrival times at a common-offset-gather of the sonic data, while the reflected waves often have different arrival times in the data. A median filter, a nonlinear filter in which each output sample is computed as the median value of the input samples under the window may be applied to the depth dimension in order to extract the waves having the same arrival time at different depths. A discussed above, the extracted waves may be identified as guided waves and may be removed from the raw waveforms taken by receiver 130 (e.g., referring to FIG. 3). To enhance the target waves, personnel may stack the target signals with different depth together after compensating the travel time different in order to enhance the signal to noise ratio (SNR) of the target signals. FIG. 12 is an image of a quadrupole signal after a guide-wave reduction method, for example, using a median filter.

Processed quadrupole data from block 808 is then rotated to different azimuths to determine quadrupole data for each azimuth in block 810. Without limitation, blocks 800-804 and block 806-810 may happen sequentially or either one before the other.

Figure 13:
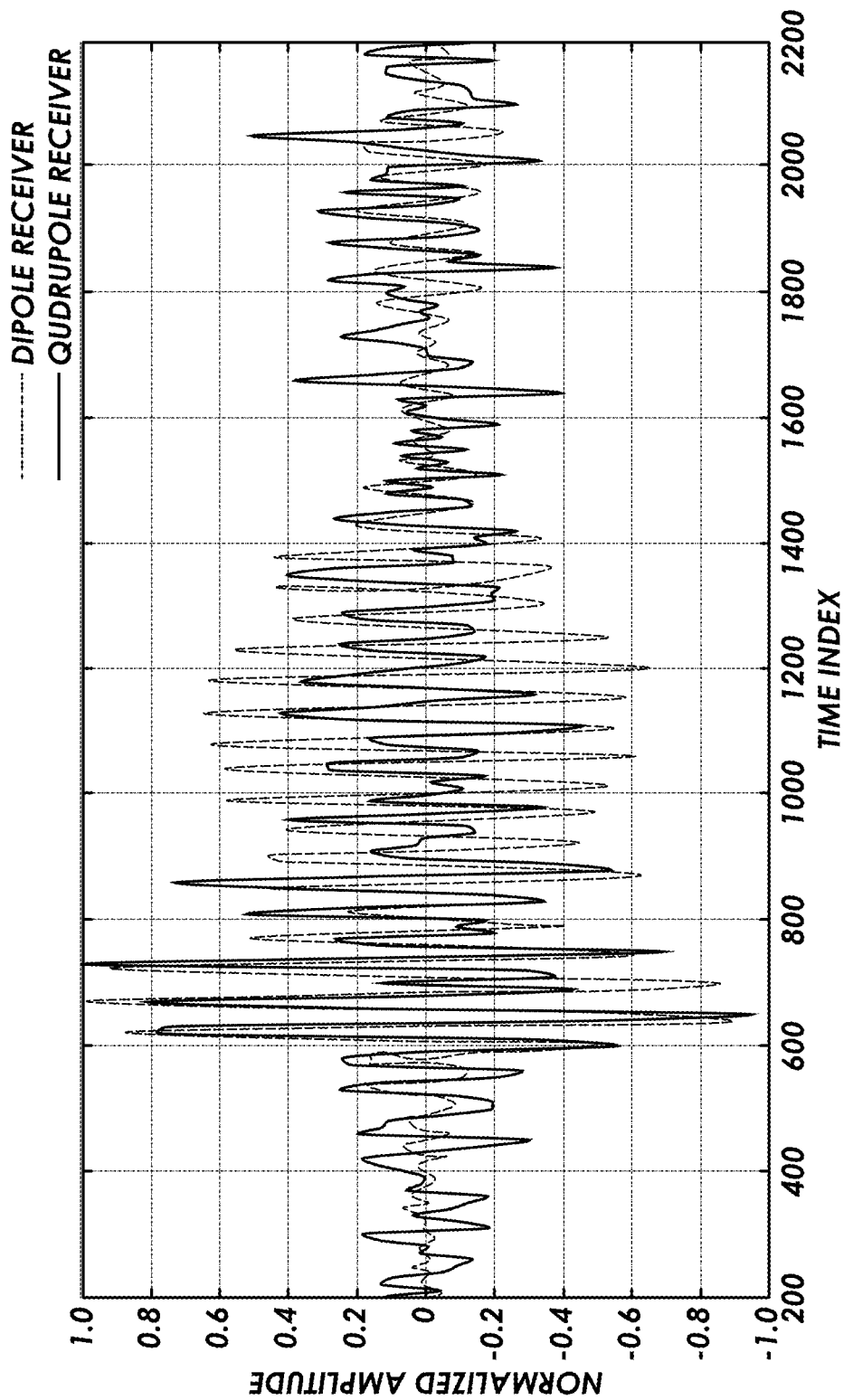
FIG. 13 is an example of a graph illustrating dipole signals and quadrupole signals.
Figure 14:
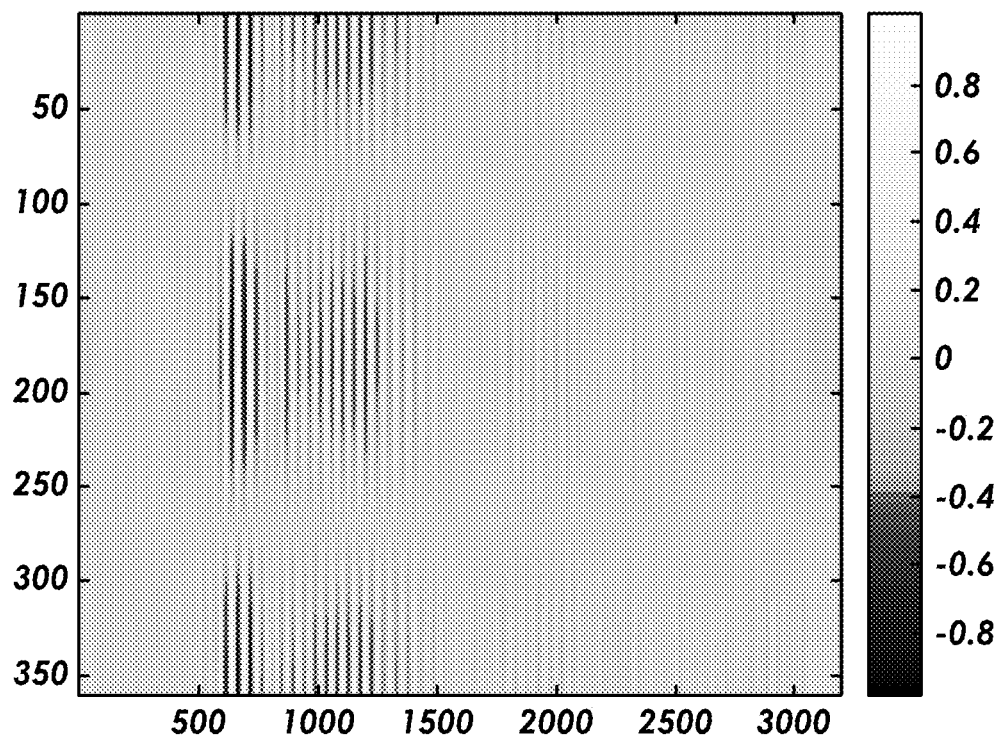
FIG. 14 is an example of a graph illustrating dipole measurements at different azimuths after rotation.
Figure 15:
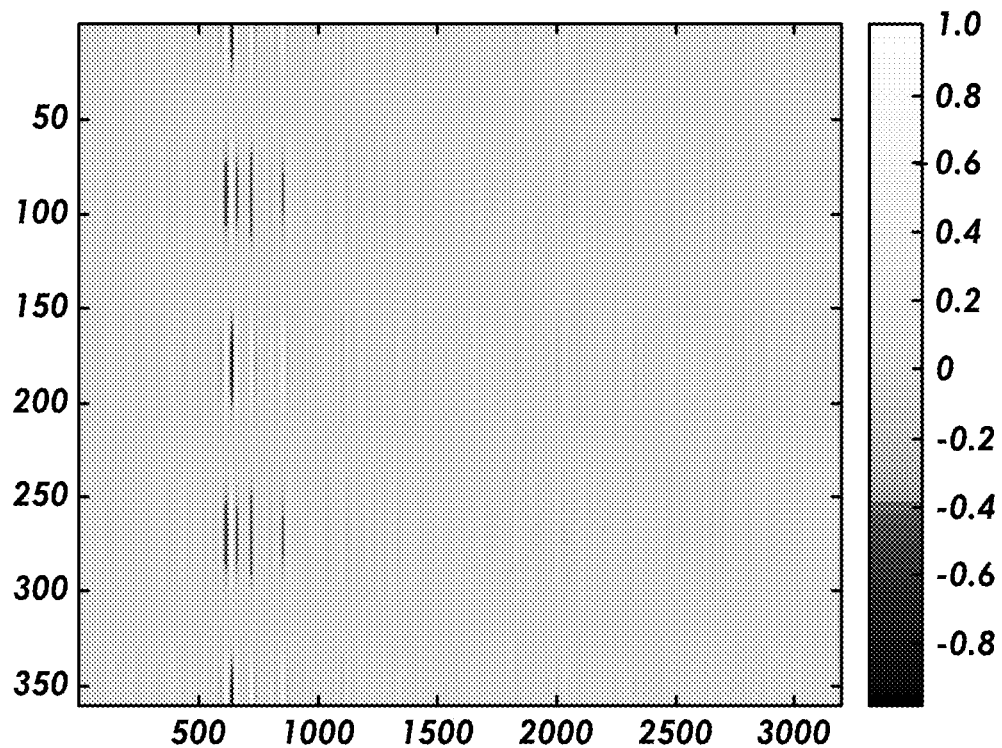
FIG. 15 is an example of a graph illustrating quadrupole measurements at different azimuths after rotation.

In block 812 the measurements at each azimuth for dipole measurements in block 804 and quadrupole measurements in block 810 are combined using Equation (1) above with information handling system 114 (e.g., referring to FIG. 1). The resulting data have three dimensions: depth, time and azimuth. FIG. 13 illustrates an example of a resulting image from combining dipole signals and quadrupole signals. Additionally, FIG. 14 is a specific example of combining dipole signals and quadrupole signals from a depth of 12,935 ft. (3943 meters) after stacking the signal to increase the SNR, as discussed above in block 802/807. FIG. 14 is an image illustrating a dipole signal at different azimuths after being rotated and FIG. 15 is a quadrupole signal at different azimuths after being rotated.

In block 814, using information handling system 114, reflector 304 in formation 132 (e.g., referring to FIG. 1) is illustrated as a three dimensional image or a two dimensional image based at least in part on the combined measurements from block 812 by applying a seismic migration method on the data, for example the reversed time migration (RTM) method.

In block 816, from the image and information in block 814, the final azimuth of reflector 304 is determined by the position of the maximum amplitude/intensity values. For example, the reflector may be identified by a strong SH wave in the 3D data. Then the amplitude/intensity of the identified waves in a fixed window are calculated versus azimuth. The angle associated with the maximum intensity value of the reflected is taken as the azimuth of the reflector. A maximum intensity value is the high measured intensity. The depth of the reflector is determined by the depth of the data with the reflection. The radial distance of the reflector is calculated from the radial distance of the reflection at the image after migration, or it can be calculated from the travel time of the reflected signals. Thus, the 3D position of the reflector, which are the azimuth, the depth and the radial distance are all estimated.

Figure 16:
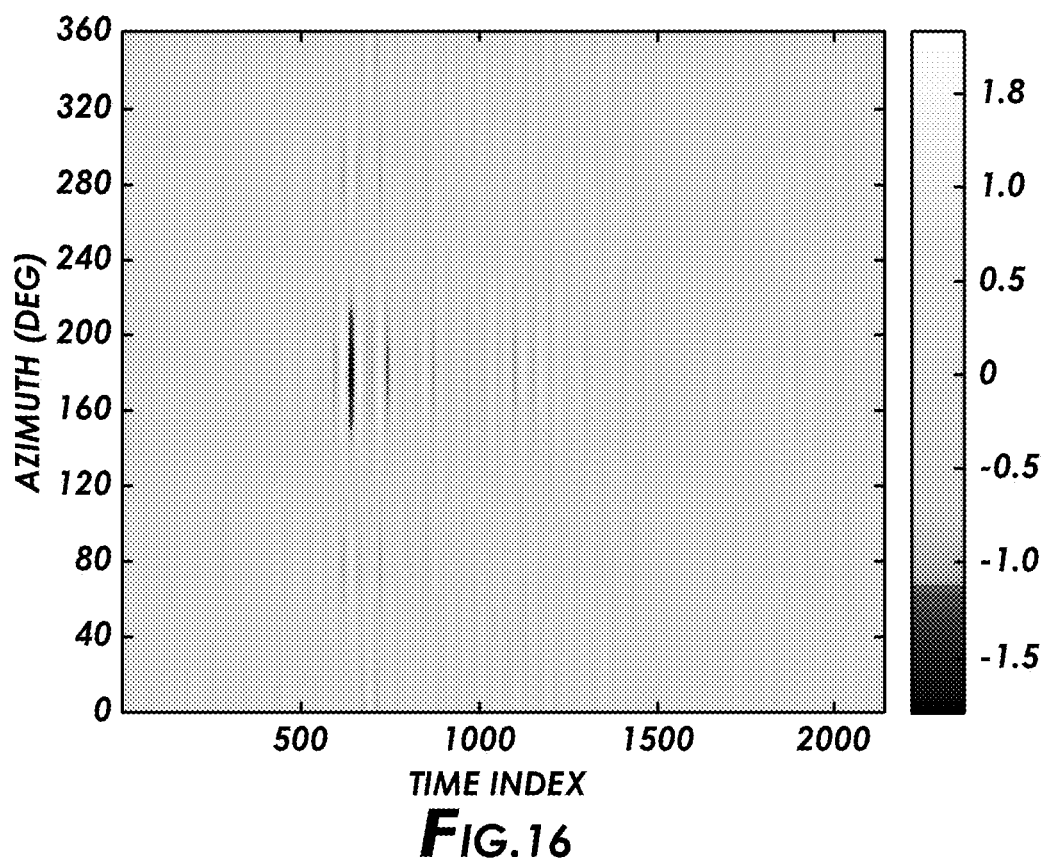
FIG. 16 is an example of a graph illustrating the combing signals from dipole measurements and quadrupole measurements.
Figure 17:
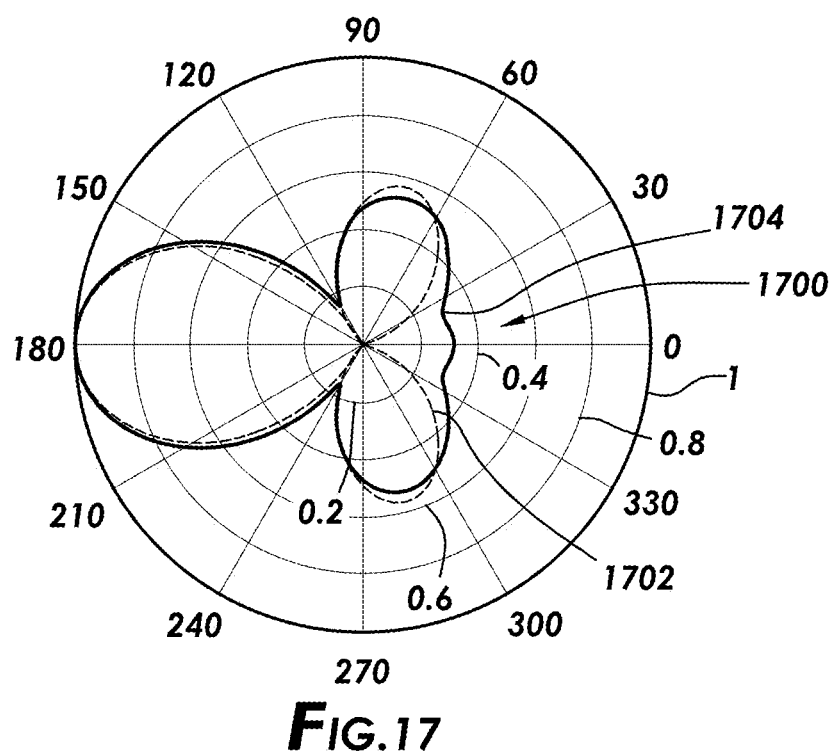
FIG. 17 is a graph illustrating a comparison between an observed and a theoretical receiving pattern.

FIG. 16 is an image that illustrates the combination of both processed dipole data and quadrupole data using Equation (1), as discussed above in block 812. FIG. 17 illustrates an observed receiving pattern 1700 from the data in FIG. 16 with a combined dipole and quadrupole receiving system. It suggests the field data 1704 agrees with the theoretical curve 1702. Therefore, the azimuth of reflector 304 (e.g., referring to FIG. 3) may be identified by the maximum of the normalized amplitude, as illustrated in FIG. 17, of received signals.

Improvements over current devices and methods may provide a reliable solution to image and identify the azimuth of the reflector in 360 degree, where current technology may have a 90- or 180-degree uncertainty. Besides, combining both dipole and quadrupole measurements may enhance the SNR of the resulting data. The method may be applied to shear waves that are polarized to the direction perpendicular to plane determined by the borehole axis and the wave propagation direction. Without limitation, the method may be applied to other waves, for example compressional waves, as well. This method and system may include any of the various features of the compositions, methods, and system disclosed herein, including one or more of the following statements.

Statement 1: A method for locating a reflector in a formation may comprise disposing a borehole sonic logging tool into a borehole. The borehole sonic logging tool may comprise one or more transmitters configured to transmit a sonic waveform into a formation and one or more receivers configured to record a response as a dipole receiver and a quadrupole receiver. The method may further comprise broadcasting the sonic waveform as a shear formation body wave or a compressional formation body wave into the formation penetrated by the borehole with the one or more transmitters, recording a reflected wave from a reflector with the one or more receivers as dipole data by the dipole receiver and quadrupole data by the quadrupole receiver, and processing the dipole data and the quadrupole data with an information handling system to determine a location of the reflector from the borehole sonic logging tool.

Statement 2. The method of statement 1, further comprising removing one or more guided waves from the dipole data and the quadrupole data.

Statement 3. The method of statement 2, further comprising rotating the dipole data and the quadrupole data to one or more azimuths.

Statement 4. The method of statement 3, further comprising combining the dipole data and the quadrupole data at the one or more azimuths.

Statement 5. The method of statement 4, further comprising forming an image of the reflector from the dipole data and the quadrupole data with a seismic migration method.

Statement 6. The method of statements 1 or 2, further comprising identifying an azimuth of the reflector from the borehole sonic logging tool.

Statement 7. The method of statements 1, 2, or 6, wherein the reflected wave includes one or more shear waves.

Statement 8. The method of statements 1, 2, 6, or 7, wherein the reflected wave includes one or more compressional waves.

Statement 9. The method of statements 1, 2, or 6-8, further comprising forming a three-dimensional image of the reflector.

Statement 10. The method of statements 1, 2, or 6-9, further comprising forming a two-dimensional image of the reflector.

Statement 11. A system for locating a reflector in a formation may comprise a borehole sonic logging tool. The borehole sonic logging tool may comprise one or more transmitters configured to transmit a sonic waveform into a formation and one or more receivers configured to record a reflected wave as a dipole receiver for dipole data and a quadrupole receiver for quadrupole data. The system may further comprise an information handling system configured to process the dipole data and the quadrupole data and determine a location of the reflector from the borehole sonic logging tool.

Statement 12. The system of statement 11, wherein the information handling system is further configured to remove one or more guided waves from the dipole data and the quadrupole data.

Statement 13. The system of statement 12, wherein the information handling system is further configured to rotate the dipole data and the quadrupole data to one or more azimuths.

Statement 14. The system of statement 13, wherein the information handling system is further configured to combine the dipole data and the quadrupole data at the one or more azimuths.

Statement 15. The system of statement 14, wherein the information handling system is further configured to form an image of the reflector from the dipole data and the quadrupole data.

Statement 16. The system of statements 11 or 12, wherein the information handling system is further configured to identify an azimuth of the reflector from the borehole sonic logging tool.

Statement 17. The system of statements 11, 12 or 16, wherein the reflected wave includes one or more shear waves.

Statement 18. The system of statements 11, 12, or 16, 17, wherein the reflected wave includes one or more compressional waves.

Statement 19, The system of statements 11, 12, or 16-18, wherein the information handling system is further configured to form a three-dimensional image of the reflector.

Statement 20. The system of statements 11, 12, or 16-19, wherein the information handling system is further configured to form a two-dimensional image of the reflector.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for locating a reflector in a formation comprising:
    disposing a borehole sonic logging tool into a borehole, wherein the borehole sonic logging tool comprises:
        one or more transmitters configured to transmit a sonic waveform into a formation; and
        one or more receivers configured to record a response as a dipole receiver and a quadrupole receiver;
    broadcasting, with the one or more transmitters, the sonic waveform as a shear formation body wave or a compressional formation body wave into the formation penetrated by the borehole;
    recording a reflected wave from a reflector with the one or more receivers as dipole data by the dipole receiver and quadrupole data by the quadrupole receiver;
    processing the dipole data and the quadrupole data with an information handling system to determine a location of the reflector from the borehole sonic logging tool, wherein the dipole data and the quadrupole data comprise only shear waves; and
    identifying an azimuth of the reflector from the borehole sonic logging tool by combining shear waves from the dipole data and shear waves from the quadrupole data at the one or more azimuths.

2. The method of claim 1, further comprising removing one or more guided waves from the dipole data and the quadrupole data.

3. The method of claim 2, further comprising rotating the dipole data and the quadrupole data to the one or more azimuths.

4. The method of claim 3, wherein combining the dipole data and the quadrupole data at the one or more azimuths uses:

$$Wav(d,t,\theta)=W_1 W_{DP}(d,t,\theta)+W_2 W_{QP}(d,t,\theta)$$

wherein Wav(d, t, θ) denotes the resulting wave forms, $W_{DP}$(d, t, θ) and $W_{QP}$(d, t, θ) represent the dipole and quadrupole waveforms, $W_1$ and $W_2$ are complicated numbers utilized for compensating amplitude and phase change due to borehole modulation, the variables d, t, θ are depth, time and azimuth of the data.

5. The method of claim 4, further comprising forming an image of the reflector from the dipole data and the quadrupole data with a seismic migration method.

6. The method of claim 1, wherein identifying the azimuth of the reflector from the borehole sonic logging tool uses at least one maximum value from the reflected wave.

7. The method of claim 1, wherein the reflected wave includes one or more shear waves.

8. The method of claim 1, wherein the reflected wave includes one or more compressional waves.

9. The method of claim 1, further comprising forming a three-dimensional image of the reflector.

10. The method of claim 1, further comprising forming a two-dimensional image of the reflector.

11. A system for locating a reflector in a formation comprising:
    a borehole sonic logging tool comprising:
        one or more transmitters configured to transmit a sonic waveform into a formation; and
        one or more receivers configured to record a reflected wave as a dipole receiver for dipole data and a quadrupole receiver for quadrupole data; and
    an information handling system configured to:
        process the dipole data and the quadrupole data, wherein the dipole data and the quadrupole data comprise only shear waves;
        determine a location of the reflector from the borehole sonic logging tool; and
        identify an azimuth of the reflector from the borehole sonic logging tool by combining shear waves from the dipole data and shear waves from the quadrupole data at the one or more azimuths.

12. The system of claim 11, wherein the information handling system is further configured to remove one or more guided waves from the dipole data and the quadrupole data.

13. The system of claim 12, wherein the information handling system is further configured to rotate the dipole data and the quadrupole data to the one or more azimuths.

14. The system of claim 13, wherein the information handling system uses:

$$Wav(d,t,\theta)=W_1 W_{DP}(d,t,\theta)+W_2 W_{QP}(d,t,\theta)$$

to combine shear waves from the dipole data and shear waves from the quadrupole data at the one or more azimuths, wherein Wav(d, t, θ) denotes the resulting wave forms, $W_{DP}$(d, t, θ) and $W_{QP}$(d, t, θ) represent the dipole and quadrupole waveforms, $W_1$ and $W_2$ are complicated numbers utilized for compensating amplitude and phase change due to borehole modulation, the variables d, t, θ are depth, time and azimuth of the data.

15. The system of claim 14, wherein the information handling system is further configured to form an image of the reflector from the dipole data and the quadrupole data.

16. The system of claim 11, wherein the information handling system is further configured to use at least one maximum value from the reflected wave to identify an azimuth of the reflector from the borehole sonic logging tool.

17. The system of claim 11, wherein the reflected wave includes one or more shear waves.

18. The system of claim 11, wherein the reflected wave includes one or more compressional waves.

19. The system of claim 11, wherein the information handling system is further configured to form a three-dimensional image of the reflector.

20. The system of claim 11, wherein the information handling system is further configured to form a two-dimensional image of the reflector.

\* \* \* \* \*